(12) United States Patent
Lindoff et al.

(10) Patent No.: US 7,817,604 B2
(45) Date of Patent: Oct. 19, 2010

(54) SHARED CONTROL CHANNEL DETECTION STRATEGIES

(75) Inventors: Bengt Lindoff, Bjärred (SE); Johan Nilsson, Höllviken (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1510 days.

(21) Appl. No.: 11/150,913

(22) Filed: Jun. 13, 2005

(65) Prior Publication Data

US 2006/0281414 A1 Dec. 14, 2006

(51) Int. Cl.
*H04B 7/216* (2006.01)

(52) U.S. Cl. .................. 370/335; 370/311; 370/342; 370/252; 455/13.4; 455/522; 455/67.11; 455/226; 375/150

(58) Field of Classification Search .......... 370/311, 370/335, 342, 252; 455/13.4, 522, 67.11, 455/226; 375/150
See application file for complete search history.

(56) References Cited

U.S. PATENT DOCUMENTS

| | | | |
|---|---|---|---|
| 6,047,187 A * | 4/2000 | Haartsen .................. | 455/450 |
| 6,377,613 B1 * | 4/2002 | Kawabe et al. ............ | 375/142 |
| 6,430,166 B1 * | 8/2002 | Bejjani et al. ............. | 370/320 |
| 6,594,501 B2 | 7/2003 | Black et al. | |
| 7,069,025 B2 * | 6/2006 | Goren et al. ............... | 455/456.2 |
| 2002/0015438 A1 | 2/2002 | Ishizu et al. | |
| 2003/0031236 A1 * | 2/2003 | Dahlman et al. ........... | 375/147 |
| 2003/0114181 A1 | 6/2003 | Lee et al. | |
| 2003/0128673 A1 | 7/2003 | Lee et al. | |
| 2003/0133430 A1 * | 7/2003 | Dickson et al. ........... | 370/342 |
| 2003/0142979 A1 | 7/2003 | Raaf | |
| 2003/0220103 A1 * | 11/2003 | Kim et al. ................ | 455/422.1 |
| 2004/0001428 A1 | 1/2004 | Datta et al. | |
| 2004/0001472 A1 | 1/2004 | Kwak et al. | |
| 2004/0023659 A1 | 2/2004 | Xiao et al. | |
| 2004/0202104 A1 | 10/2004 | Ishii et al. | |
| 2005/0078648 A1 * | 4/2005 | Nilsson .................... | 370/342 |

FOREIGN PATENT DOCUMENTS

| WO | 01/24402 A1 | 4/2001 |
|---|---|---|
| WO | 2004/072673 A | 8/2004 |

OTHER PUBLICATIONS

PCT International Search Report, mailed Sep. 21, 2006, in connection with International Application No. PCT/EP2006/063115.
PCT Written Opinion, mailed Sep. 21, 2006, in connection with International Application No. PCT/EP2006/063115.
EP Communication, dated Jan. 22, 2010, in connection with International Application No. 06 777 311.9-1246.

* cited by examiner

*Primary Examiner*—Duc Nguyen
*Assistant Examiner*—Zhiyu Lu
(74) *Attorney, Agent, or Firm*—Potomac Patent Group PLLC (57) ABSTRACT

A detection strategy is selected for use in detecting a shared control channel that is transmitted on a physical channel in a communication system. This involves using a previously selected detection strategy to detect the shared control channel. The power of the detected shared control channel is measured. At least two correlation results are generated by correlating the measured power with each of at least two parameters that are associated with one or more other physical channels used in the communication system. Based on the at least two correlation results, a detection strategy is selected for upcoming use in detecting the shared control channel.

32 Claims, 2 Drawing Sheets

SHARED CONTROL CHANNEL DETECTION STRATEGIES

BACKGROUND

The present invention relates to telecommunications, and more particularly to techniques for detecting information transmitted by means of a shared channel.

High Speed Downlink Packet-data Access (HSDPA) is an evolution of Wideband Code Division Multiple Access (WCDMA) specified in the Release 5 version of the Third-generation Partnership Project (3GPP) WCDMA specification. HSDPA introduces higher bit rates (up to over 10 Mbits/s) by using higher order modulation (16-QAM), multicodes (up to 15 with spreading factor 16), and downlink channel feedback information. Downlink channel feedback information is information, sent to the base station, regarding the downlink channel quality. The base station (BS), which in 3GPP terminology is called "node B", uses this information to optimize modulation and coding for optimized throughput. Furthermore, Hybrid ARQ is also introduced on the physical layer in order to reduce the round trip delay for erroneous received packets.

HSDPA works according to the following. A User Equipment (UE), operating in connected mode, continuously transmits Channel Quality Index (CQI) reports to the HSDPA serving node B by means of the uplink (UL) High Speed Dedicated Physical Control Channel (HS-DPCCH). The CQI informs the serving node B about the instantaneous downlink (DL) channel quality in order to enable the node B to optimize the downlink throughput. The CQI could, for example, be a function of Signal to Interference Ratio (SIR), where the particular function depends on higher layer parameters (e.g., available HS-power, and the like). When the UE is scheduled by the node B and data packets will be transmitted to the UE, the HS Shared Control Channel (HS-SCCH) is used to inform the UE about information that the UE will use in the upcoming communication, such as information about the data packets and transport format, retransmission number, and the like.

The UE demodulates information transmitted on the HS-SCCH. If the information is directed to that particular UE (recall that this is a shared channel, so the information could be directed to another UE), the UE will receive and detect data packets transmitted on a High-Speed Physical Downlink Shared Channel (HS-PDSCH). The UE then sends either an acknowledgement (ACK) or negative acknowledgement (NACK) to the serving node B by means of the HS-DPCCH. Depending on whether an NACK or ACK was received, the node B will either retransmit the same packet (that can be combined with the erroneous detected packet and hence a coding gain can be achieved) or transmit a new packet, if there are any.

As can be seen from the above description, it is very important that the UE be able to detect the information on the HS-SCCH because without this detection it cannot receive the data at all. If the UE does not detect the HS-SCCH, then no ACK/NACK will be transmitted (because the UE is unaware that it was the intended recipient of a data packet). Consequently, there will be a Discontinuous Transmission (DTX) in the uplink HS-DPCCH ACK/NACK field. The node B could detect the DTX, which in turn could cause the packet to be retransmitted. This will result in a loss in throughput, however. Furthermore, the DTX may not be detected at all because the UL ACK/NACK is a binary signal. Hence, ACK means amplitude value +1 and NACK means amplitude value −1. "Nothing at all" (DTX) corresponds to no transmitted ACK/NACK bit; that is, in the base station detector, the output should be zero. However, due to noise and other problems, zero may be erroneously detected as +1 or −1, making it difficult to discriminate DTX from ACK and NACK (i.e., the probability of erroneous DTX detection will be quite large). If a DTX is interpreted as an ACK, then a retransmission invoked by a higher layer will be needed, resulting in several packets having to be retransmitted. This will result in a significantly reduced throughput. Hence, good HS-SCCH detection performance is important both from a UE throughput point of view and also from a system capacity point of view.

One simple solution to this problem is to retune the HS-SCCH detector such that the probability of a missed detection will be reduced. However, this comes at the price of an increased false alarm probability (i.e., the UE will "think" that it has received an HS-SCCH transmission when it has in fact not). Such false alarms would heavily increase the current consumption in the UE, resulting in lower talk time, and other associated problems. Consequently, this solution is not desirable.

The ability to accurately detect transmissions on the HS-SCCH is related to the power level used to transmit information on the HS-SCCH. However, the exact power setting for HS-SCCH is up to the serving node B, and the strategy for setting this transmission power level could be different from one node to another. For example, HS-SCCH transmission power could be related to the power level used on the Dedicated Physical Control Channel (DPCCH) (i.e., power controlled). Alternatively, it could be related to the CQI (e.g., the current HS-PDSCH SIR). In yet another alternative, the transmission power on the HS-SCCH could be set to a constant output power (e.g., as the Common Pilot Channel, or "CPICH"). Other methods are also possible.

All of these different methods have different pros and cons. For instance, a power offset to DPCCH might cause the HS-SCCH to experience performance problems during Soft HandOver (SHO). This is because the HS-SCCH does not support SHO, while the DPCCH does, so that there is no SHO gain for the HS-SCCH. Hence, for highly asymmetric DL:s with a majority of the power on the non-HSDPA serving the DPCCH, very poor HS-SCCH detection performance will result.

On the other hand, relating the HS-SCCH power to the CQI means that the node B will have to guess about the relationship between the HS-PDSCH and HS-SCCH reception performance. But the node B may not have a good basis for making any such guesses. For example, the UE might use some kind of advanced detector (e.g., a Generalized-RAKE, or "G-RAKE" receiver) for receiving the HS-PDSCH, but, due to challenging real-time requirements, not use similar technology for receiving the HS-SCCH. Hence, the relative performance between the UE's HS-SCCH reception and the HS-PDSCH reception could be different compared to the "guesses" in node B. As a consequence, the UE might experience HS-SCCH reception performance that is poor for some CQI:s and better for others. This will again result in a loss of throughput.

Finally, consider the case in which the HS-SCCH transmission power is set to a constant level. Here, a high level could be chosen in order to ensure that the signal is capable of reaching the cell border. This is in some sense a good solution from the UE's point of view, since it enables the use of a simpler detector that uses less current while still providing good performance. However, this is not a desirable solution from the point of view of the serving node B because it results in capacity loss.

It is apparent from the above discussion that there is a need for methods and apparatuses in the UE that will optimize the detection of information transmitted on the HS-SCCH while still allowing the serving node B to employ any of a number of HS-SCCH power setting strategies. While this problem has been described with specific reference to HSDPA communication systems, it will be readily apparent that similar problems can exist in communications systems adhering to other standards. Thus, solutions are needed in these other systems as well.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other aspects are achieved in methods and apparatuses that select a detection strategy for use in detecting a shared control channel that is transmitted on a physical channel in a communication system. Selection involves using a previously selected detection strategy to detect the shared control channel. The power of the detected shared control channel is measured. Also, at least two correlation results are generated by correlating the measured power with each of at least two parameters that are associated with one or more other physical channels used in the communication system. Selecting a detection strategy for upcoming use in detecting the shared control channel is based on the at least two correlation results.

In various alternative embodiments, the parameters that are associated with one or more other physical channels may include one or more of the following: a power measure of another physical channel; a signal to noise ratio; and an indicator of reception quality of another physical channel.

In some embodiments, the communications system is a Wideband Code. Division Multiple Access (WCDMA) communications system. One of the at least two parameters that are associated with one or more other physical channels can be, in such embodiments, a Channel Quality Indicator (CQI).

In another aspect, if one of the correlation results indicates that the measured power of the detected shared control channel is correlated with the CQI, then selecting a detection strategy for upcoming use in detecting the shared control channel comprises increasing a number of despreaders allocated to detecting the shared control channel.

In another aspect, the shared control channel in some embodiments is a HS-SCCH.

One of the one or more other physical channels can be a Common Pilot Channel (CPICH). Also, in some embodiments, if one of the correlation results indicates that the measured power of the detected shared control channel is correlated with the CPICH, then selecting a detection strategy for upcoming use in detecting the shared control channel involves decreasing a number of despreaders allocated to detecting the shared control channel.

In some embodiments, one of the one or more other physical channels is a Dedicated Physical Control Channel (DPCCH). In some of these embodiments, one of the correlation results indicates whether the measured power of the detected shared control channel is correlated with a Signal to Interference Ratio of the DPCCH; and selecting a detection strategy for upcoming use in detecting the shared control channel comprises, during soft handover, performing:

determining whether a condition $SIR_1 < SIR_{ref} - k$ (dB) is true, wherein $SIR_1$ represents a signal-to-interference ratio experienced by User Equipment (UE) only from a serving cell, $SIR_{ref}$ represents a signal-to-interference ratio experienced by the UE from all cells combined, and k is a predetermined constant, and if the condition $SIR_1 < SIR_{ref} - k$ (dB) is true, then choosing an uplink Transmission Power Control (TPC) based on only the $SIR_1$.

In yet another aspect, one of the correlation results can indicate whether the measured power of the detected shared control channel is correlated with a Signal to Interference Ratio of the DPCCH; and in such embodiments, selecting a detection strategy for upcoming use in detecting the shared control channel comprises selecting a RAKE detector for use in detecting the shared control channel if one of the correlation results indicates that the measured power of the detected shared control channel is correlated with a Signal to Interference Ratio of the DPCCH.

In still other aspects, selecting a detection strategy can comprise one or more of the following: selecting a number of RAKE fingers to be used in detecting the shared control channel; and selecting a detection algorithm (e.g., selecting whether to use a RAKE receiver, and/or selecting whether to use a G-RAKE receiver).

BRIEF DESCRIPTION OF THE DRAWINGS

The aspects and advantages of the invention will be understood by reading the following detailed description in conjunction with the drawings in which.

DETAILED DESCRIPTION

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

As mentioned in the Background section, there is a need for methods and apparatuses in the UE that will optimize the detection of information transmitted on the HS-SCCH while still allowing the serving node B to employ any of a number of HS-SCCH power setting strategies. While this problem has been presented and described with specific reference to HSDPA communication systems, it will be readily apparent that similar problems can exist in communications systems adhering to other standards. That is, it may be necessary in other types of systems for a receiver to detect information transmitted on a channel whose specific power settings are unknown to the receiver. In order to facilitate an understanding of the various aspects of the invention, the exemplary embodiments described below are presented in the context of an HSDPA system. However, those of ordinary skill in the art will readily recognize the principles involved, and will be able to adapt these for use in other systems where similar problems arise.

In an aspect of the invention, a UE infers what HS-SCCH power control mechanism is being used by its serving node B, and then adapts its HS-SCCH detection technique based on the inference. For example, if the HS-SCCH transmission power is related to the power of the downlink DPCCH by determining a power offset from the downlink DPCCH power, there will be a telltale high correlation between the HS-SCCH power and the DPCCH power. If the HS-SCCH is transmitted at a constant power level, then the HS-SCCH power will instead be correlated to the Common Pilot Channel (CPICH) power. Furthermore, if the HS-SCCH transmission power is set in relation to the CQI reports, then a high correlation will be expected between the HS-SCCH power and the CQI. Hence, by correlating the HS-SCCH power to different signals, information about how the HS-SCCH power is set can be detected in the UE.

Based on the power setting inferred from these techniques, different HS-SCCH detection strategies can be selectively employed in the UE. For example, if the HS-SCCH is related to the power controlled DPCCH by a power offset value, then a power control strategy favoring the HSDPA serving cell in SHO can be used, thereby minimizing the HS-SCCH performance loss during time instants when the HSDPA non-serving cell is the power controlled downlink.

Furthermore in case the HS-SCCH power is related to the CQI, then a more advanced detection algorithm (e.g., G-RAKE) for the HS-SCCH could be chosen, or a more conservative CQI algorithm could be applied. It will be recalled that a high CQI value means good signal quality, so a high data rate can be received on HS-PDSCH. That also means that the message transmitted on HS-SCCH could be detected using less power from the base station. Typically, in the network planning one often assumes similar detection performance for different channels (for same code rate and other parameters, the detection performance of HS-PDSCH and HS-SCCH should be the same). However, in any given embodiment of a terminal, this is not always true due to limited processing power. For example, most of the processing power in HSDPA might be put on HS-PDSCH, and less on HS-SCCH. Under these circumstances, if the CQI is too high, the HS-SCCH could be transmitted with too low power, meaning that the terminal (UE) would not detect HS-SCCH (but would likely be able to detect HS-PDSCH without any problem if the terminal had a way of knowing that it was the intended recipient of the message). In order to combat this, if HS-SCCH power is correlated to the CQI, then the terminal could bolster its detection algorithm on HS-SCCH (e.g., by applying more RAKE fingers or despreaders, or alternatively using G-RAKE instead of RAKE), or it could send a lower CQI value (indicating a bit worse channel) in order to cause the HS-SCCH transmission power to be increased.

Finally in case a constant HS-SCCH power level is used, then a less advanced HS-SCCH detector could be employed, thereby saving hardware and Digital Signal Processing (DSP) resources. These savings can, in turn, be used to reduce current consumption in the UE, or to increase HS-PDSCH detection performance.

These and other aspects of the invention are now described in greater detail in connection with exemplary embodiments.

Figure 1:
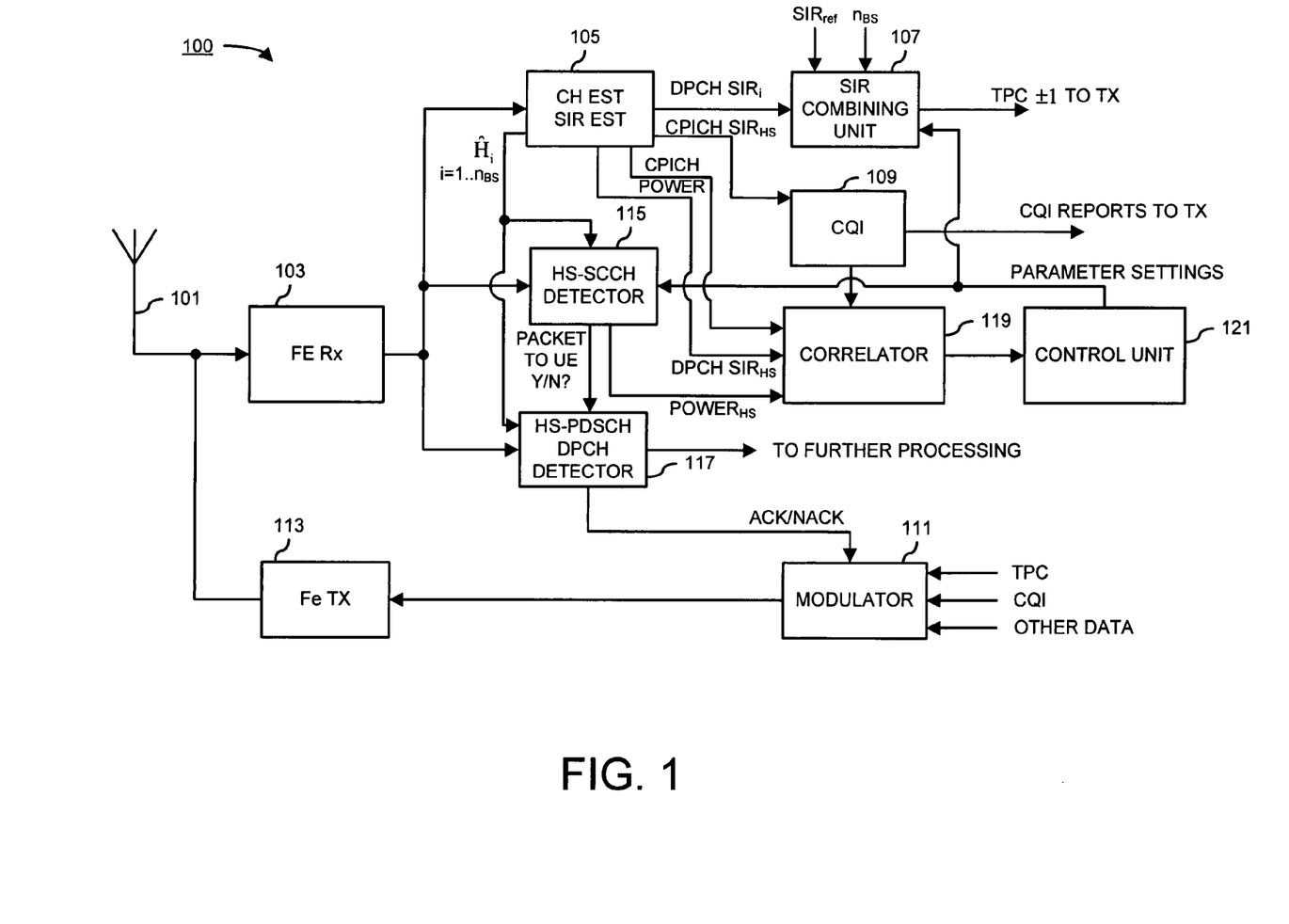
FIG. 1 illustrates a block diagram of an exemplary embodiment of the invention.

FIG. 1 illustrates a block diagram of an exemplary embodiment of the invention. Assume that a UE 100 is in connected mode and that an HSDPA session is ongoing. Further assume that the number of links that the UE 100 is connected to (the active set) is $n_{bs}$, and that the HSDPA serving cell is node B1. A composite signal, including the radio signal from the node B1, is received through a receiver antenna 101. The radio signal from the node B1 is down-converted to a baseband signal by a front end Receiver (Fe RX) 103. This signal is fed to a channel and SIR estimation unit 105 that generates estimates, $\hat{H}_i$, of the radio channels for all links in the active set using the CPICH and derives the DPCH SIR for all downlinks. The DPCH SIR:s for all links in the active set are fed to the SIR combining unit 107 that combines the SIR for all links and compares the resulting SIR to the SIR target ($SIR_{ref}$) and, based on the outcome from that comparison, sets the uplink Transmission Power Control (TPC). The combination is typically the sum of SIR for all downlinks in the active set, but as will be discussed later could be performed in other ways.

The channel and SIR estimation unit 105 also computes the CPICH $SIR_{HS}$, that is the SIR estimated on the CPICH for the HSDPA serving cell", and feeds this to a CQI unit 109 that maps the CPICH $SIR_{HS}$ to a CQI value, according to a higher layer specific procedure. The resulting CQI value is relayed to the node B via a modulator 111 and front end Transmitter (Fe TX) 113.

The signal from the front end Receiver 103 is also fed to a HS-SCCH detector 115 that, using the channel estimate and information from higher layers (e.g., UE identity) detects whether the HS-PDSCH is directed to the UE 100 or not. The HS-SCCH detector 115 operates, at least in part, based on supplied parameter values (e.g., number of fingers or despreaders used/detector scheme (Rake/G-Rake for instance)), which in the beginning are based on a default parameter setting. If the packet is directed to the UE 100, then a DPCH detector 117 operates to detect the incoming HS-PDSCH, which is then supplied to other units (not shown) for further processing. Such further processing is not tied to the invention, and is well-known in the art. Consequently, it need not be described here in detail.

The detected power level of the HS-SCCH is output from the HS-SCCH detector 115 to a correlator 119 that correlates the HS-SCCH power level to a number of signals, such as the CPICH power, the DPCH SIR and also to the CQI value reported last time. The resulting correlation value output by the correlator 119 is the result of filtering a number of instantaneous comparison values generated over a period of time. The output from the correlator 119 is fed to a control unit (CU) 121 that detects whether the HS-SCCH is correlated to some of the other signals. If the correlation between the HS-SCCH power and any of the signals is above a certain threshold, indicating that the HS-SCCH power setting is related to that signal, then the specific HS-SCCH detection parameters optimized for that power setting strategy are, in response, fed to the HS-SCCH detector unit 115 as well as to other related units (e.g., the SIR combining unit 107). The new parameters will be used during the next Transmission Time Interval (TTI).

The focus of the discussion will now shift to presenting exemplary parameter settings based on various possible outcomes generated by the correlator 119. Assume first that it is determined that the HS-SCCH power is correlated to the DPCCH SIR, indicating that there is a power offset between the Dedicated Physical Channel (DPCH) and the HS-SCCH. In this case, it is known that there could be performance problems during SHO as described above. Hence during SHO, in case the SIR for the DPCCH is low for the HSDPA serving cell (remember that $SIR_1 + \ldots + SIR_{n_{bs}} \approx SIR_{ref}$), the SIR combining unit 107 should only focus on the $SIR_1$, which in this example is the SIR for the HSDPA serving cell. To carry out this strategy, the following exemplary rule could be used in the control unit 121:

If $SIR_1 < SIR_{ref} - k$ (dB), then choose an uplink TPC (UL-TPC) value based on only $SIR_1$; otherwise, chose an UL-TPC value based on the sum of SIR:s. A typical value of k could typically be 4-5 dB, although it could be appropriate to set k to a different value in other embodiments.

Furthermore, if the HS-SCCH power is correlated to the DPCCH SIR, then the control unit 121 may further specify that only a standard Rake detector is to be used.

Now instead consider the case in which it is determined that the HS-SCCH power is correlated to the CQI reports. Here the UE should put higher processing load on the HS-SCCH detection. For example, more despreaders (fingers) can be allocated to HS-SCCH detection and a G-RAKE detector can be used. Alternatively, the UE can use a RAKE detector for HS-SCCH and report a more conservative CQI value to the node B.

Turning now to another possibility, consider the case in which the HS-SCCH power is found to be related to the CPICH power, indicating that the HS-SCCH is being transmitted at a high constant power from the node B. Under these circumstances, the UE can relax the processing load for the HS-SCCH detector, at least in cases not involving soft handover (e.g., when the UE is not close to the cell border). Relaxation of processing load can be implemented by, for example, using only a Rake receiver with relatively few fingers to detect the information on the HS-SCCH.

Aspects of the invention will now be further described in connection with FIG. 2, which is a flow chart of steps carried out in the UE 100, for example in the exemplary control unit 121. Assume that the UE is in connected mode and that an HSDPA session in ongoing (step 201). The UE 100 detects the HS-SCCH using the specific parameter settings/strategy indicated by the control unit 121 (step 203). A test is performed to determine whether a HS data packet was detected as being directed to the UE 100 (decision block 205). If not, ("NO" path out of decision block 205), then processing returns to step 203 to wait until the next TTI.

If a HS data packet was detected as being directed to the UE 100 ("YES" path out of decision block 205), then the UE 100 receives and detects the HS-PDSCH (step 207). The HS-SCCH power is measured and, using the correlator 119, correlated to at least two parameters that are associated with one or more other channels used in the communication system (step 209). The at least two parameters that are associated with one or more other channels used in the communication system can include, for example, any two or more of the following: the CPICH power, the CQI, and the DPCH SIR as described earlier.

A test is then performed to determine whether any of the correlation values exceeds a predetermined correlation threshold value (decision block 211). If none of them do ("NO" path out of decision block 211), then the control unit 121 selects default parameter settings (step 213) to be used for the next HS-SCCH detection operation, and processing reverts back to step 203.

However, if any of the correlation values exceeds the predetermined correlation threshold value ("YES" path out of decision block 211), then the control unit 121 selects an HS-SCCH detection strategy and parameter settings based on the outcome generated by the correlator 119 (step 215). In the event that two or more correlations exceed the threshold, an exemplary embodiment can base the HS-SCCH detection strategy and parameter settings on which correlation was the highest. In cases in which two correlation values are deemed to be the same, then a combination of strategies might be used. For example, if the correlation indicates both "constant power, related to CPICH" and "power based on CQI", then a receiver can adopt a strategy in which a more conservative CQI report is sent and the number of RAKE fingers used for HS-SCCH detection is kept constant. Other combinations might be used as well. The selected detection strategy and parameter settings will be used during a next HS-SCCH detection operation so processing then reverts back to step 203.

The invention has been described with reference to particular embodiments. However, it will be readily apparent to those skilled in the art that it is possible to embody the invention in specific forms other than those of the embodiment described above.

For example, exemplary embodiments presented herein have described the possibility of determining whether the measured power of the HS-SCCH is correlated with a signal to interference ratio of another channel. However, this could alternatively be accomplished by determining whether the measured power of the HS-SCCH is correlated with a signal to noise ratio. This is because noise comprises interference and thermal noise. Interference in CDMA systems becomes noise-like, being spread out over the band and with a level in the noise floor region. Thus, for purposes of the invention, signal to noise ratios could be used in place of signal to interference ratios in such systems. As used herein, and in the claims, the term "signal to noise ratio" shall be construed to cover true signal to noise ratios, as well as what might more accurately called "signal to interference ratios."

The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of selecting a detection strategy for use in detecting a shared control channel that is transmitted as a physical channel in a communication system, the method comprising:

using a previously selected detection strategy to detect the shared control channel;

measuring power of the detected shared control channel;

generating at least two correlation results by correlating the measured power with each of at least two parameters that are associated with one or more other physical channels used in the communication system; and selecting, based on the at least two correlation results, a detection strategy for upcoming use in detecting the shared control channel, wherein the shared control channel is a High-Speed Shared Control Channel; and wherein one of the one or more other physical channels is a Common Pilot Channel.

2. The method of claim 1, wherein one of the at least two parameters is a power measure of another physical channel.

3. The method of claim 1, wherein one of the at least two parameters is a signal to noise ratio.

4. The method of claim 1, wherein one of the at least two parameters is an indicator of reception quality of another physical channel.

5. The method of claim 1, wherein the communications system is a Wideband Code Division Multiple Access (WCDMA) communications system.

6. The method of claim 5, wherein one of the at least two parameters is a Channel Quality Indicator (CQI).

7. The method of claim 6, comprising:
if one of the correlation results indicates that the measured power of the detected shared control channel is correlated with the CQI, then selecting a detection strategy for upcoming use in detecting the shared control channel comprises increasing a number of despreaders allocated to detecting the shared control channel.

8. The method of claim 1, wherein:
if one of the correlation results indicates that the measured power of the detected shared control channel is correlated with the Common Pilot Channel, then selecting a detection strategy for upcoming use in detecting the shared control channel comprises decreasing a number of despreaders allocated to detecting the shared control channel.

9. The method of claim 1, wherein one of the one or more other physical channels is a Dedicated Physical Control Channel.

10. The method of claim 9, wherein:
one of the correlation results indicates whether the measured power of the detected shared control channel is correlated with a Signal to Interference Ratio of the Dedicated Physical Control Channel; and
selecting a detection strategy for upcoming use in detecting the shared control channel comprises, during soft handover, performing:
determining whether a condition SIR1<SIRref−k(dB) is true, wherein SIR1 represents a signal-to-interference ratio experienced by User Equipment (UE) only from a serving cell, SIRref represents a signal-to-interference ratio experienced by the UE from all cells combined, and k is a predetermined constant, and
if the condition SIR1<SIRref−k(dB) is true, then choosing an uplink Transmission Power Control (TPC) based on only the SIR1.

11. The method of claim 9, wherein:
one of the correlation results indicates whether the measured power of the detected shared control channel is correlated with a Signal to Interference Ratio of the Dedicated Physical Control Channel; and
selecting a detection strategy for upcoming use in detecting the shared control channel comprises selecting a RAKE detector for use in detecting the shared control channel if one of the correlation results indicates that the measured power of the detected shared control channel is correlated with a Signal to Interference Ratio of the Dedicated Physical Control Channel.

12. The method of claim 1, wherein selecting a detection strategy comprises selecting a number of RAKE fingers to be used in detecting the shared control channel.

13. The method of claim 1, wherein selecting a detection strategy comprises selecting a detection algorithm.

14. The method of claim 13, wherein selecting a detection algorithm comprises selecting whether to use a RAKE receiver.

15. The method of claim 13, wherein selecting a detection algorithm comprises selecting whether to use a G-RAKE receiver.

16. The method of claim 1, wherein selecting a detection algorithm comprises selecting a power control strategy.

17. An apparatus for selecting a detection strategy for use in detecting a shared control channel that is transmitted as a physical channel in a communication system, the apparatus comprising:
logic that uses a previously selected detection strategy to detect the shared control channel;
logic that measures power of the detected shared control channel;
logic that generates at least two correlation results by correlating the measured power with each of at least two parameters that are associated with one or more other physical channels used in the communication system; and
logic that selects, based on the at least two correlation results, a detection strategy for upcoming use in detecting the shared control channel,
wherein the shared control channel is a High-Speed Shared Control Channel; and
wherein one of the one or more other physical channels is a Common Pilot Channel.

18. The apparatus of claim 17, wherein one of the at least two parameters is a power measure of another physical channel.

19. The apparatus of claim 17, wherein one of the at least two parameters is a signal to noise ratio.

20. The apparatus of claim 17, wherein one of the at least two parameters is an indicator of reception quality of another physical channel.

21. The apparatus of claim 17, wherein the communications system is a Wideband Code Division Multiple Access (WCDMA) communications system.

22. The apparatus of claim 21, wherein one of the at least two parameters is a Channel Quality Indicator (CQI).

23. The apparatus of claim 22, comprising:
logic that, if one of the correlation results indicates that the measured power of the detected shared control channel is correlated with the CQI, selects a detection strategy for upcoming use in detecting the shared control channel by increasing a number of despreaders allocated to detecting the shared control channel.

24. The apparatus of claim 17, wherein:
the logic that selects, based on the at least two correlation results, a detection strategy for upcoming use in detecting the shared control channel performs:
if one of the correlation results indicates that the measured power of the detected shared control channel is correlated with the Common Pilot Channel, then decreasing a number of despreaders allocated to detecting the shared control channel.

25. The apparatus of claim 17, wherein one of the one or more other physical channels is a Dedicated Physical Control Channel.

26. The apparatus of claim 25, wherein:
one of the correlation results indicates whether the measured power of the detected shared control channel is correlated with a Signal to Interference Ratio of the Dedicated Physical Control Channel; and
the logic that selects a detection strategy for upcoming use in detecting the shared control channel comprises, if one of the correlation results indicates that the measured power of the detected shared control channel is correlated with a Signal to Interference Ratio of the Dedicated Physical Control Channel, then performing during soft handover:

determining whether a condition SIR1<SIRref−k(dB) is true, wherein SIR1 represents a signal-to-interference ratio experienced by User Equipment (UE) only from a serving cell, SIRref represents a signal-to-interference ratio experienced by the UE from all cells combined, and k is a predetermined constant, and if the condition SIR1<SIRref−k(dB) is true, then choosing an uplink Transmission Power Control (TPC) based on only the SIR1.

27. The apparatus of claim 25, wherein:

one of the correlation results indicates whether the measured power of the detected shared control channel is correlated with a Signal to Interference Ratio of the Dedicated Physical Control Channel; and the logic that selects, based on the at least two correlation results, a detection strategy for upcoming use in detecting the shared control channel performs selecting a RAKE detector for use in detecting the shared control channel if one of the correlation results indicates that the measured power of the detected shared control channel is correlated with a Signal to Interference Ratio of the Dedicated Physical Control Channel.

28. The apparatus of claim 17, wherein the logic that selects a detection strategy comprises logic that selects a number of RAKE fingers to be used in detecting the shared control channel.

29. The apparatus of claim 17, wherein the logic that selects a detection strategy comprises logic that selects a detection algorithm.

30. The apparatus of claim 29, wherein the logic that selects a detection algorithm comprises logic that selects whether to use a RAKE receiver.

31. The apparatus of claim 29, wherein the logic that selects a detection algorithm comprises logic that selects whether to use a G-RAKE receiver.

32. The apparatus of claim 17, wherein the logic that selects a detection algorithm comprises logic that selects a power control strategy.

* * * * *

UNITED STATES PATENT AND TRADEMARK OFFICE
CERTIFICATE OF CORRECTION

| | | |
|---|---|---|
| PATENT NO. | : 7,817,604 B2 | |
| APPLICATION NO. | : 11/150913 | |
| DATED | : October 19, 2010 | |
| INVENTOR(S) | : Lindoff et al. | |

It is certified that error appears in the above-identified patent and that said Letters Patent is hereby corrected as shown below:

On the Title Page, in the Figure, for Tag "211", in Line 2, delete "ORRELATON" and insert -- CORRELATION --, therefor.

Figure 2:
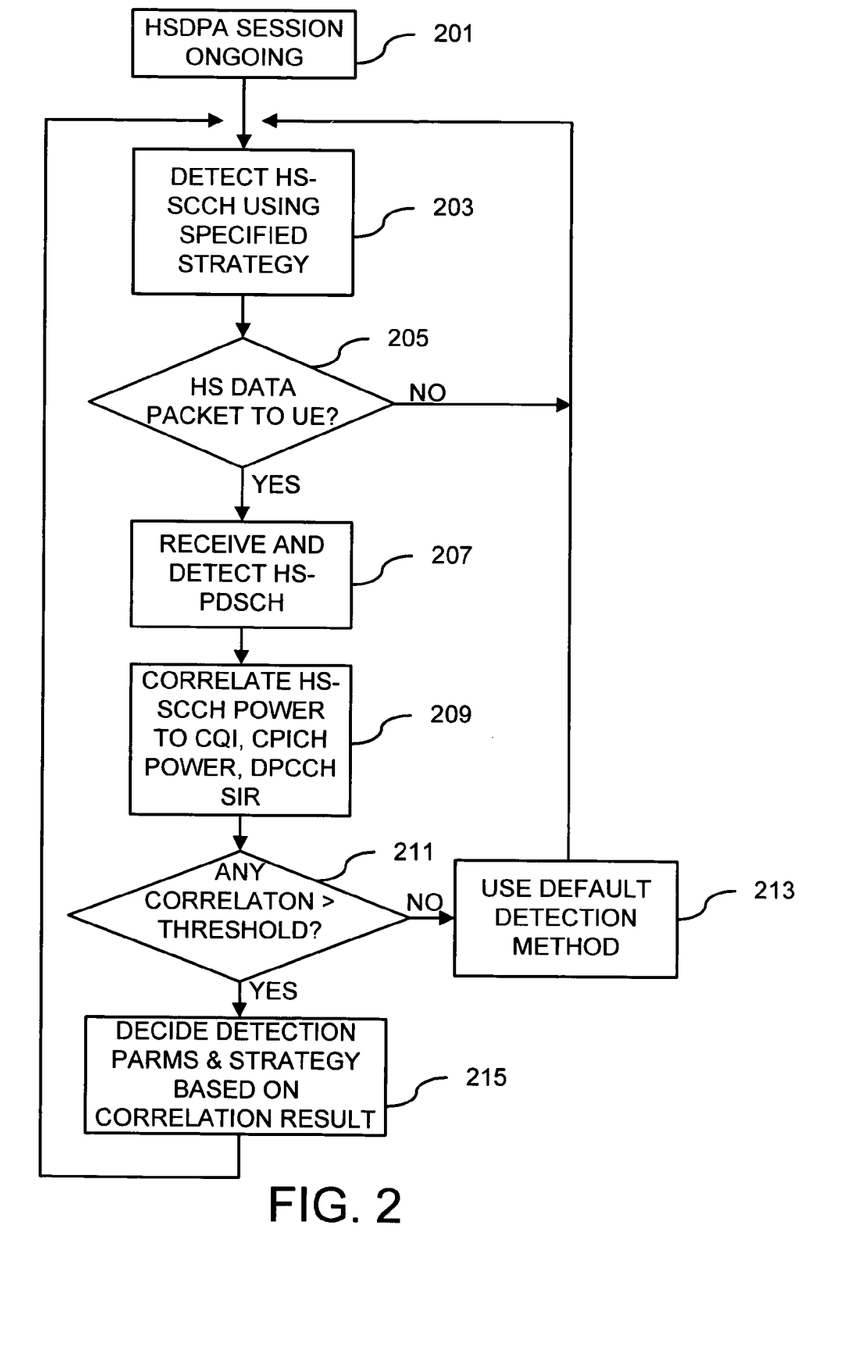
FIG. 2 illustrates a flow chart of exemplary steps carried out in the UE in accordance with the invention.

In Fig. 2, Sheet 2 of 2, for Tag "211", in Line 2, delete "CORRELATON" and insert -- CORRELATION --, therefor.

In Column 3, Line 38, delete "Code." and insert -- Code --, therefor.

In Column 9, Line 38, in Claim 10, delete "SIR1<SIRref-k(dB)" and insert -- $SIR_1 < SIR_{ref} - k(dB)$ --, therefor.

In Column 9, Line 39, in Claim 10, delete "SIR1" and insert -- $SIR_1$ --, therefor.

In Column 9, Line 41, in Claim 10, delete "SIRref" and insert -- $SIR_{ref}$ --, therefor.

In Column 9, Line 44, in Claim 10, delete "SIR1<SIRref-k(dB)" and insert -- $SIR_1 < SIR_{ref} - k(dB)$ --, therefor.

In Column 9, Line 46, in Claim 10, delete "SIR1." and insert -- $SIR_1$. --, therefor.

In Column 11, Line 4, in Claim 26, delete "SIR1<SIRref-k(dB)" and insert -- $SIR_1 < SIR_{ref} - k(dB)$ --, therefor.

In Column 11, Line 5, in Claim 26, delete "SIR1" and insert -- $SIR_1$ --, therefor.

In Column 11, Line 7, in Claim 26, delete "SIRref" and insert -- $SIR_{ref}$ --, therefor.

In Column 11, Line 10, in Claim 26, delete "SIR1<SIRref-k(dB)" and insert -- $SIR_1 < SIR_{ref} - k(dB)$ --, therefor.

Signed and Sealed this
Ninth Day of August, 2011

David J. Kappos
*Director of the United States Patent and Trademark Office*

CERTIFICATE OF CORRECTION (continued)
U.S. Pat. No. 7,817,604 B2

In Column 11, Line 12, in Claim 26, delete "SIR1." and insert -- $SIR_1$. --, therefor.